July 9, 1929.  R. M. TEMPLE  1,720,456
STUFFING BOX
Filed Nov. 24, 1924
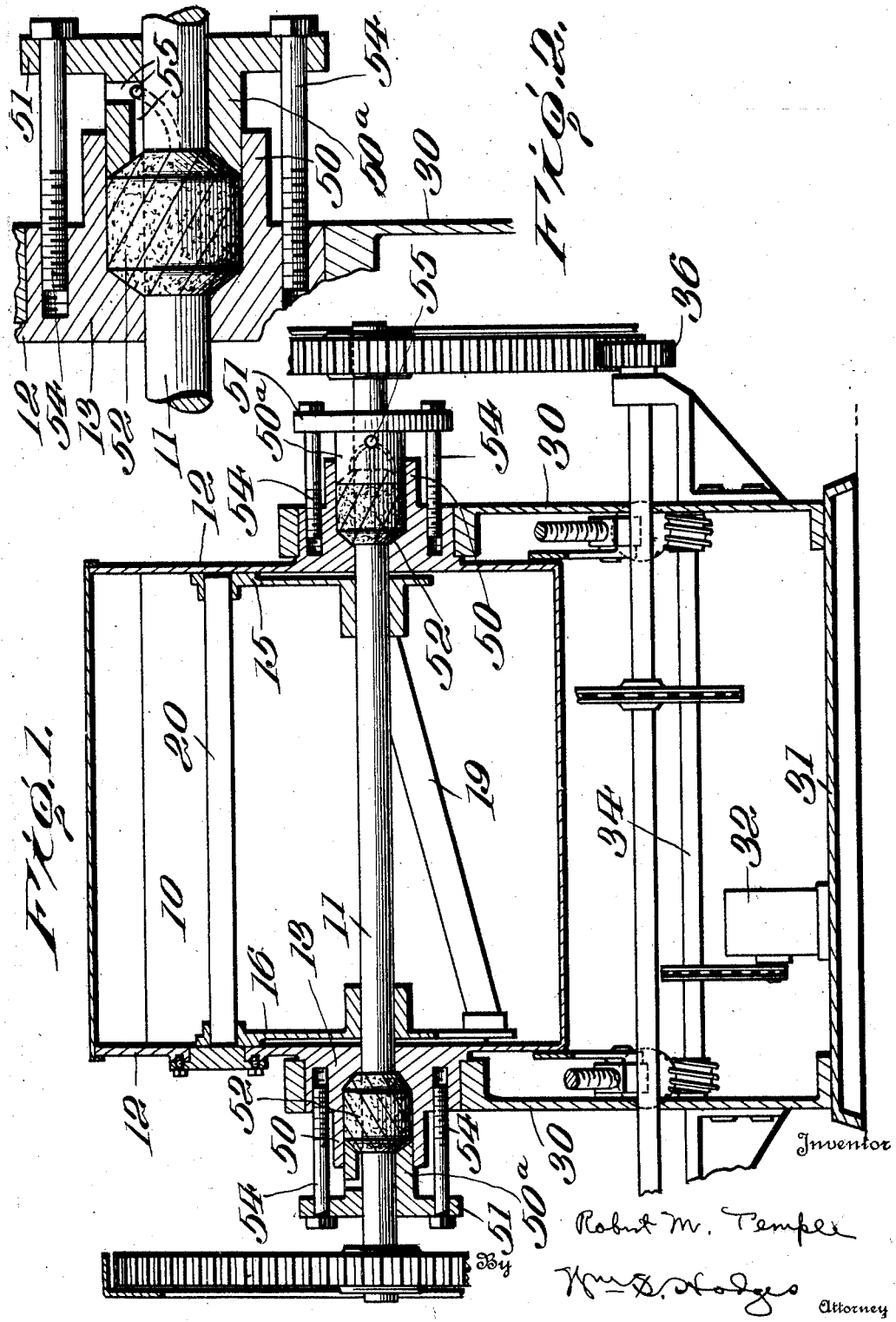

Patented July 9, 1929.

1,720,456

UNITED STATES PATENT OFFICE.

ROBERT M. TEMPLE, OF PHILADELPHIA, PENNSYLVANIA.

STUFFING BOX.

Application filed November 24, 1924. Serial No. 751,918.

This invention is a device for the prevention of leakage around agitator shafts and the like, although not limited to use on shafts of this particular type.

One of the objects of the invention is to provide a stuffing box which may be readily applied to or removed from a shaft, and provided with means to insure a leak-proof joint. A further object is to provide a stuffing box, so constructed that the compression on the packing may be adjusted from time to time as required. A further object is to provide means by which the packing may be conveniently lubricated.

The invention will be hereinafter fully set forth and particularly pointed out in the claims.

In the accompanying drawing:—

Figure 1 is a longitudinal sectional view of a mixing device such as is illustrated and described in Letters Patent 1,510,165 dated September 30, 1924. Figure 2 is an enlarged detail view illustrating the stuffing box.

Referring to the drawing, 10 designates the casing of a mixing receptacle, and 11 is the main shaft extending longitudinally therethrough. The ends of said shaft project through the end walls 12, and are mounted in suitable bearings 13. Keyed or otherwise secured to the shaft are spiders 15 and 16, carrying beater rods 19 and a rubber rod 20 as described in said patent.

The bearings 13 are supported by standards 30 extending upwardly from the base 31. Rotation is imparted to the shaft 11 by means of a drive shaft 34, provided with gears 36 meshing with gears which are secured to the shaft 11. The drive shaft 34 is driven by a motor 32 through suitable sprocket gearing.

To prevent leakage around the agitator shaft movable stuffing boxes are employed, through which the ends of the shaft 11 extend. It is preferred to provide the bearings 13 with a hub having a sleeve-like extension 50, in which is slidably mounted a sleeve 50ª. The inner end of the sleeve 50ª provides a packing abutment which is separated by a substantial space from a similar abutment formed by the adjacent end of the sleeve 50. The space between the abutments is filled by a plurality of approximately parallel strips or strands 52 of packing material, said strips of packing material being in contact with each other throughout their lengths, each strip being of a length corresponding to the space between the abutments. These strips or strands may be constructed of any desired packing material and are disposed in a slightly inclined position across the axes of the shaft, i. e. with the ends of the strips on opposite sides of said axes, but also bent around the shaft so as to impart a slight twist to each strand in a helical direction. The ends of the strips or strands are positioned to bear against the abutments, as clearly shown in Figure 2. Compression is brought against the ends of the strips 52 by means of the adjustable clamp screws 54, the heads of which engage a flange 51 on the sleeve 50ª, the threaded shanks of said screws engaging with correspondingly threaded recesses in the hub 13. A suitable oil opening 55 is provided for lubricating purposes, said opening communicating with channels which lead to the positions where lubrication is required.

It is preferred to construct the strips or strands 52 of independent lengths of any known packing material, and of approximately uniformed dimensions, the lengths being graded to permit the strips to lie between the ends of the sleeves 50 and 50ª, length-wise of the shaft upon the surface thereof but slightly inclined across the axes of the shaft so that the ends of the strips will be on opposite sides of said axis. In placing the strips in the positions indicated and causing them to conform to the curvature of the shaft they are each necessarily given a slight twist in a helical direction but nevertheless are maintained in parallel relation with each other, and in an angular position with respect to the shaft which deviates very slightly from the axial line of the shaft. In other words, each packing is made up of a plurality of independent disconnected strips 52 placed between ends of the sleeves 50 and 50ª, and with ends of the strips abutting against the ends of said sleeves. When the sleeves are adjusted toward each other, the ends of the packing strips are also moved toward each other, serving to distort the strips by endwise pressure so that the required contact between the packing strips and the shaft and the stuffing box is maintained. To enhance the operation of the packing, the end of each strip may be slightly beveled as shown to conform to the tapered contour of the abutment ends of the sleeves 50 and 50ª.

In this connection, it will be noted that the high and low transverse edges of each of the beveled portions of the strips 52 are not disposed at right angles with respect to the longitudinal median line of the strips, but are at such an angle that while the strips are assembled in their normally angular positions with respect to the axis of the shaft 12, said beveled portions cooperate to provide annular beveled ends concentric with said axis and complemental to the annular tapers of the abutment ends of said sleeves 50 and 50ª.

Experience has demonstrated that stuffing boxes of the type commonly used are very unsatisfactory. By means of the stuffing box herein described, with the packing strips disposed as described, the rotation of the shaft serves to carry the lubricant around so as to maintain a contact with the packing and prevent it from becoming hard. By tightening the screws 54, the packing strips are forced into close engagement with the shaft thereby maintaining a tight joint. The packing may be of any desired material. It will be particularly noted that in Figure 1, the sets of packing strips of the two bearings are disposed at different angles, i. e., the angle of inclination of both sets is inwardly and upwardly. An important advantage is gained by this arrangement. For instance, if for any reason any liquids may have seeped into the interstices between the strips, the centrifugal force created by rotation of the shaft in a direction indicated by the upward inclinations of the packing strips, will tend to draw said fluids inwardly toward the bearing members 13 and the interior of the casing, said interstices acting as channels for liquids. Thus, seeping liquids are not only drawn backwardly but a force is created during rotation of the shaft, which tends to resist such seepage.

Having thus explained the nature of the invention and described an operative manner of constructing and using the same, although without attempting to set forth all of the forms in which it may be made, or all of the forms of its use, what is claimed is:—

1. A stuffing box of the character described comprising a bearing member provided with a sleeve and means for rotatably supporting a shaft, a second sleeve telescoping with the first sleeve, and a plurality of packing strips of approximately uniform dimensions located between the ends of said sleeves and in lateral contact with each other throughout their lengths, all of said strips extending in approximately uniform parallel relation at a slight angle across the axis of the shaft so as to assume a slightly helical position around said shaft, the angle of said strips with respect to the shaft being such that the centrifugal force created by rotation of said shaft in a predetermined direction will cause any fluids in the interstices between the strips to travel toward said bearing member.

2. A stuffing box of the character described comprising a bearing member provided with a sleeve and means for rotatably supporting a shaft; a second sleeve telescoping with the first sleeve, the inner ends of said sleeves being tapered, and a plurality of packing strips of approximately uniform dimensions located between the ends of said sleeves and in lateral contact with each other throughout their lengths, all of said strips extending in approximately uniform parallel relation at a slight angle across the axis of the shaft so as to assume a slightly helical position around the shaft, the angle of said strips with respect to the shaft being such that the centrifugal force created by rotation of said shaft in a predetermined direction will cause any fluids located in the interstices between said strips to travel toward said bearing member, the ends of each of said strips being provided with beveled portions so shaped that while the strips are assembled in their normally angular positions with respect to the axis of the shaft, said beveled portions cooperate to provide annular beveled ends concentric with said axis.

In testimony whereof I have hereunto set my hand.

ROBERT M. TEMPLE.